United States Patent [19]

Latta, Jr. et al.

[11] 4,138,668

[45] Feb. 6, 1979

[54] SCHOOL BUS STOP SIGN

[75] Inventors: Joseph E. Latta, Jr., Orange High Rd., Hillsborough, N.C. 27278; Virgil M. Stafford, High Point, N.C.

[73] Assignee: said Joseph E. Latta, Jr., by said Virgil M. Stafford

[21] Appl. No.: 841,358

[22] Filed: Oct. 12, 1977

[51] Int. Cl.² ........................ B60Q 1/46; G08B 5/26
[52] U.S. Cl. ........................ 340/130; 116/63 R; 40/466
[58] Field of Search ............... 340/130, 129, 127, 120, 340/142, 107; 116/63R; 40/53 R

[56] References Cited

U.S. PATENT DOCUMENTS

| | | | |
|---|---|---|---|
| 2,243,472 | 5/1941 | Roan et al. | 340/130 |
| 3,133,265 | 5/1964 | Fultz | 340/130 X |
| 3,741,147 | 6/1973 | Downing | 340/130 X |

*Primary Examiner*—Donald J. Yusko
*Attorney, Agent, or Firm*—B. B. Olive

[57] ABSTRACT

An electrically-powered school bus stop sign apparatus mounts either partially recessed within the exterior panel of the body of the school bus adjacent the driver or, alternatively, on the exterior panel. A DC motor and associated arm/linkage mechanical means is used to deploy and retract the stop sign blade with the controls being operated by the driver from within the bus.

4 Claims, 14 Drawing Figures

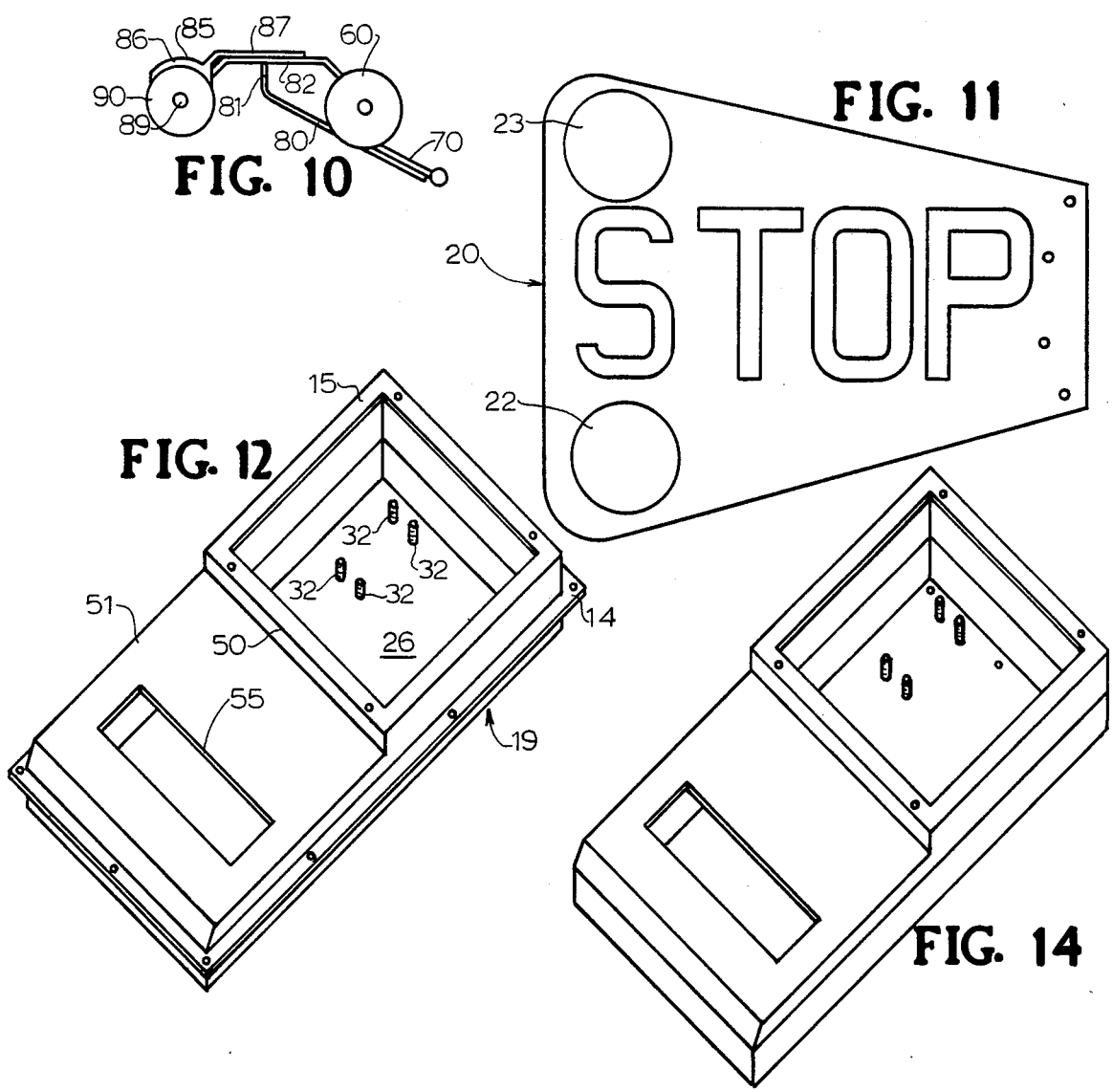
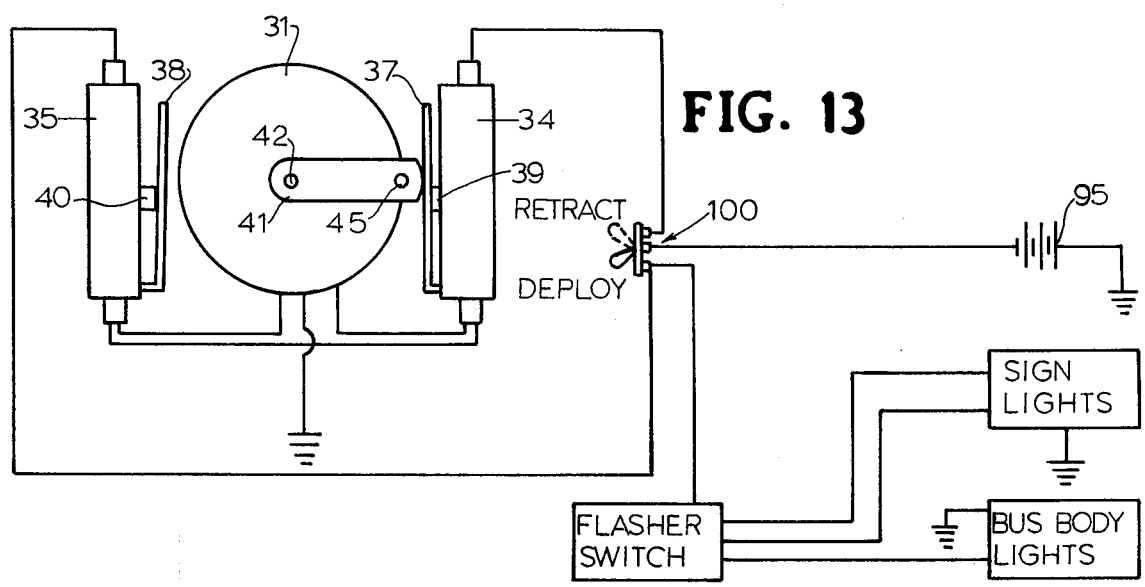

SCHOOL BUS STOP SIGN

BACKGROUND OF THE INVENTION

1. Field of the Invention

The invention relates generally to apparatus for deploying a sign. More particularly, the invention relates to an apparatus for electromechanically deploying a school bus stop sign.

2. Description of the Prior Art

Since the 1930's, school buses have been equipped with a stop sign mechanism powered by a vacuum system. The sign is normally held against the side of the bus by a spring retainer. When the control valve is opened, the vacuum pulls in a diaphragm which overrides the spring retainer and causes the sign to swing out about a vertical axis. Appropriate circuitry is connected to a vacuum valve plunger to activate blinking lights on the sign and on the front and back of the bus. However, the sign itself is deployed solely by the vacuum system. Closing of the valve causes the diaphragm to return to its normal position and the sign returns to the side of the bus.

Use of the vacuum system necessitates the location of a large vacuum source tank on the chassis of the bus and running of tubing from a vacuum source (the engine intake manifold) to the tank, through a valve and to the diaphragm. Such tubing, especially when made from copper, is expensive to purchase and even more expensive to install. A rupture of any of the tubing renders the sign system inoperative. The neoprene diaphragm of the vacuum system can develop air leaks from being exposed to the weather. It is a time consuming repair job (up to 1½ hours) to remove the sign from the bus, disassemble it, replace the diaphragm, reassemble and replace the sign. U.S. Pat. No. 2,252,529 describes this vacuum sign.

U.S. Pat. Nos. 2,144,813; 2,243,472 and 2,281,717 are illustrative of attempts at providing efficient electromechanical motor vehicle signal devices. German Patent 682897 also shows an electromechanical sign device.

U.S. Pat. Nos. 2,384,689 and 3,094,683 are illustrative of manually-operated school bus sign devices.

It is believed that no one has ever developed an acceptable electromechanically driven swing-out sign for school buses. The sole manufacturer of swing-out signs for school buses has not deemed it necessary to introduce any of the electrically-driven models developed. Lack of communication of any of the patented electrical-driven signs indicates that they were unacceptable in the market or for commercialization. However, with approximately 50,000 school buses being sold in the United States each year, there is an acute need for a reliable and easy-to-maintain electrical sign which will eliminate the vacuum tank and accompanying tubing.

SUMMARY OF THE INVENTION

The invention provides an electrically-powered school bus stop sign apparatus having a longer operational life than the vacuum type apparatus and which is easier and less expensive to repair when failures occur. The motor drive assembly, cam and linkage used in the invention are removable as a subassembly and can be replaced without removing the sign from the bus. The design consolidates all of the precision components of the sign into an easily-produced unit. The circuitry for activating the blinking sign and body lights is connected to a manual switch which deploys and retracts the sign and the lights blink in the same manner as in the prior art.

The invention, in particular, provides a reliable, electromechanically powered swing out stop sign and arm and linkage mechanism for use on school buses. The mechanism is mounted in a small, rectangular box, which can be partially recessed in the exterior panel of the body of the school bus. The sign itself is mounted on the outer face surface of the bus and is adapted to swing out about a vertical axis. The unit is designed with a unique bi-directional spring arrangement so that should the sign be struck from either the front or back side while in extended position, the sign will pivot against spring tension about an axis so that no damage is transmitted to the drive mechanism or the sign itself.

A switch is located near the driver's seat and enables the driver to energize a reversible DC drive motor for rotation of the sign. The motor has complimentary arm and linkage mechanism which swings the sign out 90 degrees and then returns the sign to its normal retracted position. A pair of limit switches are used to cut the motor off when the sign reaches the desired positions in both deployed and retracted modes.

The actuating mechanism connecting the DC drive motor to the sign comprises a rotatable arm rotated directly by the shaft of the drive motor, a connecting rod or linkage and a pair of limit switches. With the rotation of the arm, the connecting rod moves the sign in or out.

DESCRIPTION OF THE DRAWINGS

FIG. 10 is a plan view of the spring-loaded arrangement permitting pivoting of the sign once deployed.

FIG. 11 is a plan view of a sign employed with the apparatus of the present invention.

FIG. 12 is a perspective view of the preferred housing of the present invention.

FIG. 13 is a circuit diagram showing the circuitry for deploying the sign and for retracting the sign and for flashing the bus body and sign lights.

FIG. 14 is a perspective view of an alternative housing for direct attachment to the bus sidewall.

DESCRIPTION OF THE PREFERRED EMBODIMENT

Figure 1:
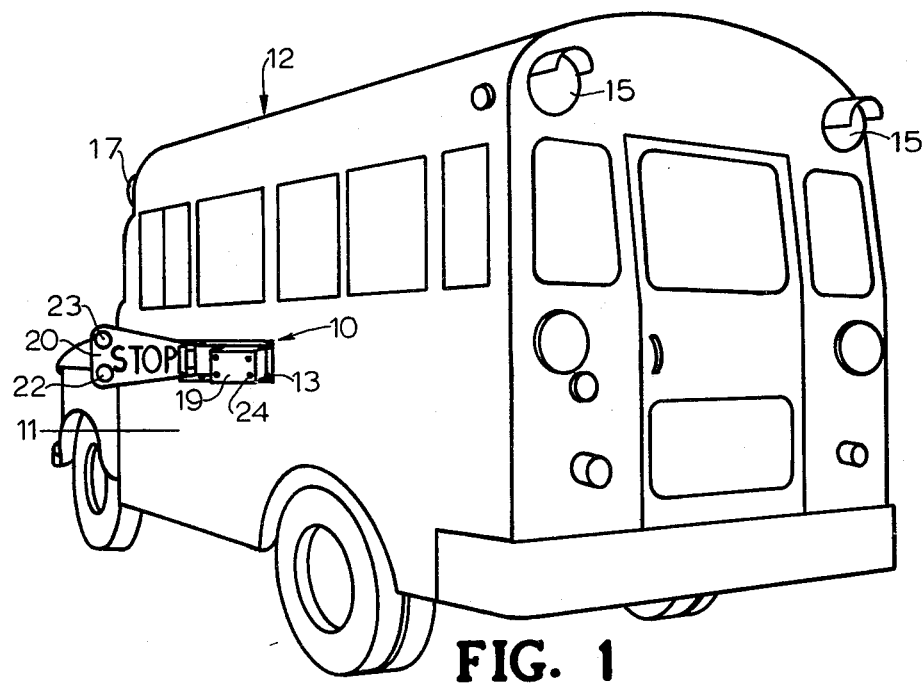
FIG. 1 is a pictorial view of a school bus with the invention stop sign unit partially recessed in the outside panel of the bus on the driver side thereof.

As illustrated in FIG. 1, the electrically-operated school bus stop sign unit 10 in a first embodiment mounts partially recessed in the exterior side panel 11 of the body of school bus 12 and is held in place by screws 13 passing through flange 14 and securing into side panel 11. School bus stop sign unit 10 includes a sign 20 which, in FIG. 1, is shown deployed approximately 90 degrees from bus 12 in a position where sign 20 is readily visible to both following and oncoming traffic. School bus stop sign unit 10 of the invention is electrically tied to the usual sign lights 22, 23 and rear and front bus body lights 15 and 17. In the deployed position, the invention unit 10, as later explained, causes lights 22, 23 to blink or flash along with lights 15 and 17 to alert drivers of nearby cars that bus 12 is either loading or unloading children.

Housing 19, of school bus stop sign unit 10, in the first embodiment being described is partially recessed within side panel 11. A cover 21 of housing 19 is removably secured to housing 19 by screws 24 to facilitate repairs of component parts within housing 19. Housing 19 includes a top housing portion 25 and a bottom housing portion 26. Housing portions 25, 26 are secured together by welding or other suitable means. Top portion 25 has the outwardly extending peripheral, thin, flat, mid-positioned flange 14 previously mentioned through which unit 10 is screwed into place. The school bus stop sign unit 10 can thus be recessed in the exterior side panel 11 so that the unit 10 is positioned between frame members 27, 28 of bus 12.

An L-shaped bracket 30 bolts into bottom housing portion 26 and mounts on its upright portion a DC motor 31 and associated gear housing 29, by means of bolts 16, the gears of which, although not shown, are driven by the shaft of motor 31. Bolts 32 are integral with bottom portion 26 and mount bracket 30 locked in place by nuts 33. The end of housing 19 which contains bracket 30, motor 31 and gear housing 29 is substantially deeper than the opposite end and its related mechanism as shown in the drawings. Normally closed limit switches 34, 35 are also mounted on bracket 30, as best seen in FIGS. 2-5 and 8. Switches 34, 35 are fastened to bracket 30 by screws 36 which fasten into bracket 30. Sensing arms or springs 37, 38 are used to depress plungers 39, 40, respectively, as arm 41 contacts springs 37, 38 during the activation and travel of arm 41. Arm 41 is driven by shaft 42 of gear housing 29. Ordinarily arm 41 makes a semi-circular path as shown by the arrows in FIGS. 4, 5 but in case of a malfunction, arm 41 is also adapted to make a 360° revolution without damage. A stub shaft 45 is rigidly fixed on the outer surface of arm 41 opposite and parallel to shaft 42 and extends beyond a sufficient distance to provide a mount. Connecting rod 46 mounts pivotally upon shaft 45, with washers 43, 44 on either side, and is held in place by cotter pin 47.

Figure 2:
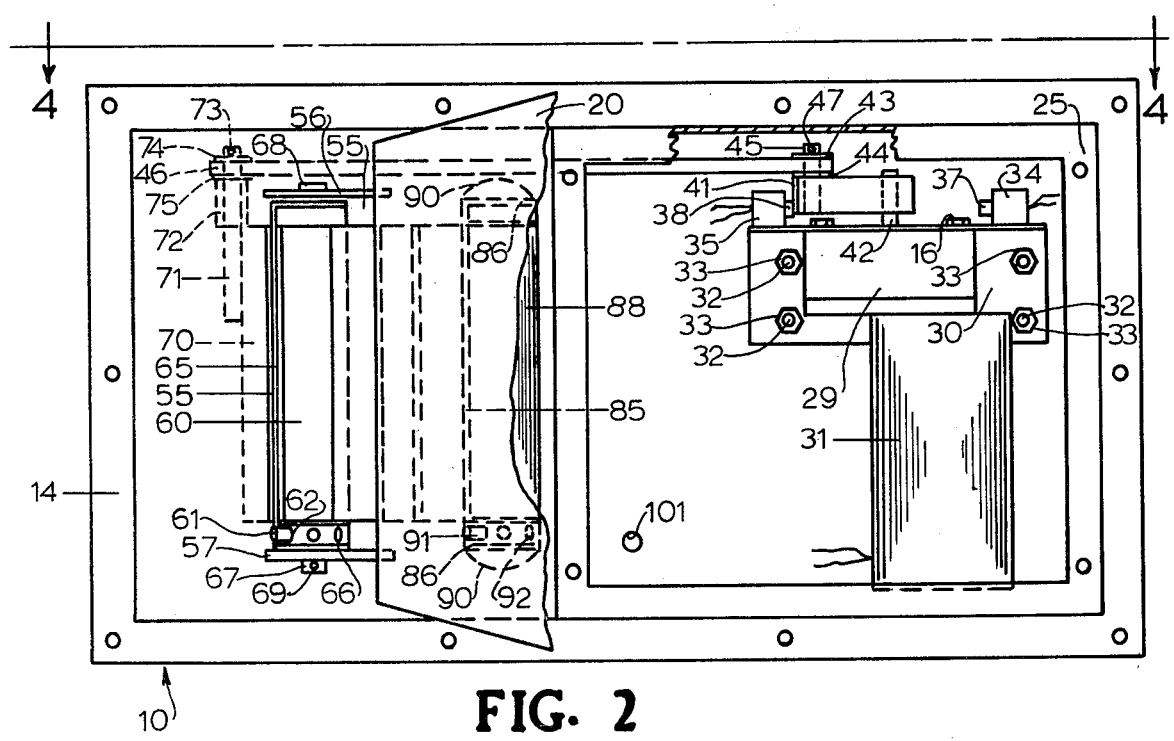
FIG. 2 is a plan view of the unit with the sign in a retracted position but with a large portion of the sign cut away, the cover removed, the wiring eliminated and illustrating the position of the internal mechanism in the retracted position.
Figure 3:
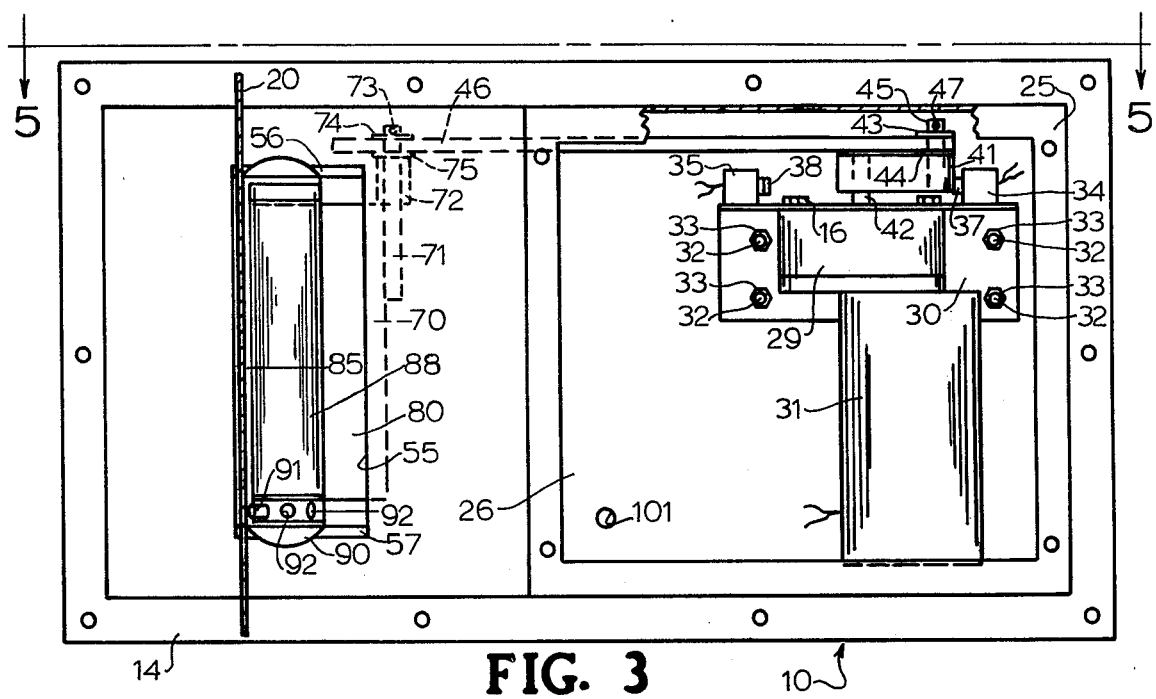
FIG. 3 is a view similar to that of FIG. 2 but with the sign in a deployed position and the internal mechanism in the position taken once the sign is deployed.
Figure 4:
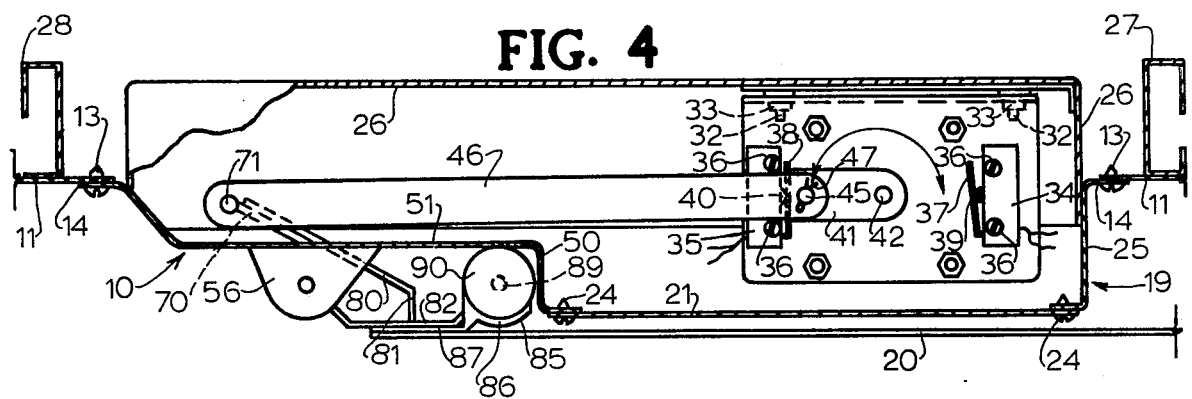
FIG. 4 is a side elevation section view of the unit sign in a retracted position and disclosing the internal mechanism.
Figure 5:
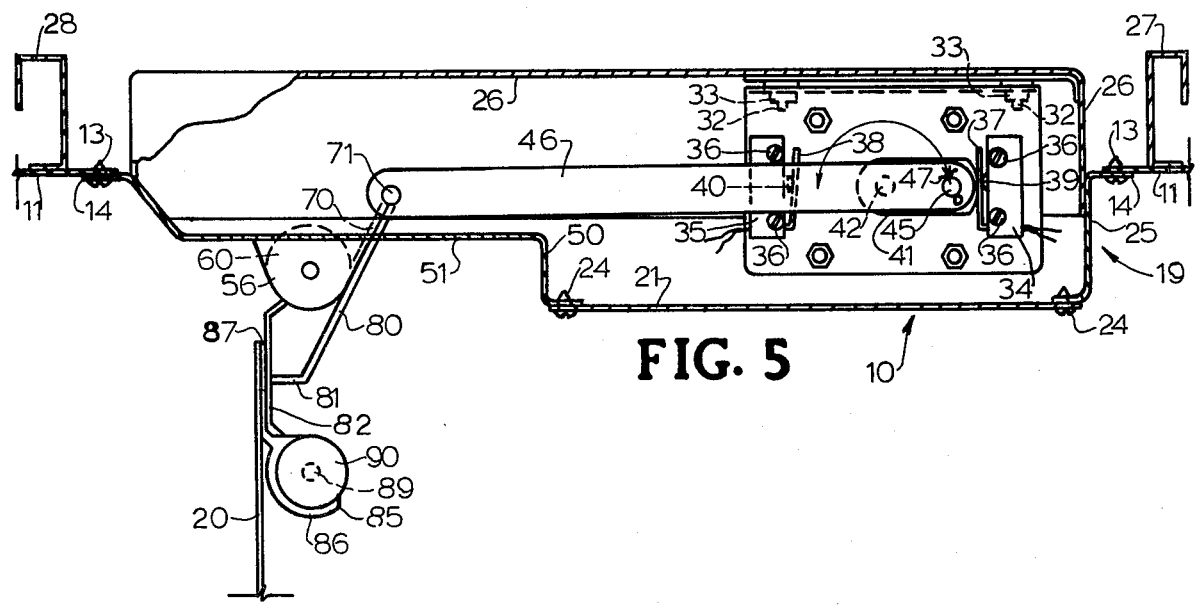
FIG. 5 is a side elevation section view similar to that of FIG. 4 but with the sign deployed.

As previously mentioned, the rearwardly disposed end of housing 19 which contains motor 31 and gear housing 29 is considerably deeper than the opposite forward end which in fact drops back at wall 50 and continues the remainder of the length as wall 51 which is parallel to but substantially lower than cover 21. An opening 55 in wall 51 has adjacent thereto a pair of outwardly extending brackets 56, 57 rigidly secured to wall 51. Brackets 56, 57 receive pivotally therebetween a spring loaded cylinder 60 of the type conventionally used in two-way swinging doors and the like. Cylinder 60 is capable of being adjusted for spring tension by moving pin 61 into the appropriate hole 62, as seen in FIG. 2, depending upon whether more or less tension is needed.

A partial sleeve 65 has angle portions 66 which mount on a shaft 67 which passes through cylinder 60 and is pivotally held between brackets 56, 57 by shaft head 68 and cotter pin 69. Pin 61 is held against sleeve 65 by the tension of the internal spring (not shown). Extension 70 of sleeve 65 is rigidly secured, e.g., by welding, to shaft 71 which pivots in connecting rod 46. Connecting rod 46 in turn is held in place on shaft 71 by spacer 72 and cotter pin 73. A pair of washers 74, 75 mount on shaft 71 adjacent either side of rod 46. As cam 41 is rotated by shaft 42, connecting rod 46 is caused to move which in turn causes shaft 71 and extension 70 to rotate.

A plate 80 is rigidly secured, e.g., by welding, to extension 70 and extends therefrom and the end thereof is angled at the end 81. Plate 80 is of a size which permits it to pass through opening 55 in wall 51 of housing 19 and end 81 is designed to rest against extension 82 of cylinder 60. Extension 82 is rigidly secured, e.g., by welding, to cylinder 60 and causes cylinder 60 to rotate when extension 82 is forced forwardly by end 81 (see FIGS. 5-7).

A second partial sleeve 85 has angle portions 86 and a leg or extension 87. A second spring-loaded cylinder 88 similar to cylinder 60, mounts on a shaft 89 which passes through cylinder 88 and pivots in angle portions 86. Caps 90 maintain shaft 89 and cylinder 88 in position within angle portions 86. Cylinder 88 has a pin 91 and hole 92 arrangement like that of cylinder 60 for applying tension upon the spring (not shown) within cylinder 88. Extension 87 is rigidly secured to extension 82, e.g., by welding. Extension 87, extension 82 and cylinder 88 thus can move together. Sign 20 is secured by any desired or required means to the side of extension 87 opposite extension 82. Sign 20 is thus normally deployed as end 81 of plate 80 moves outward to the position illustrated in FIGS. 3 and 5.

Figure 6:
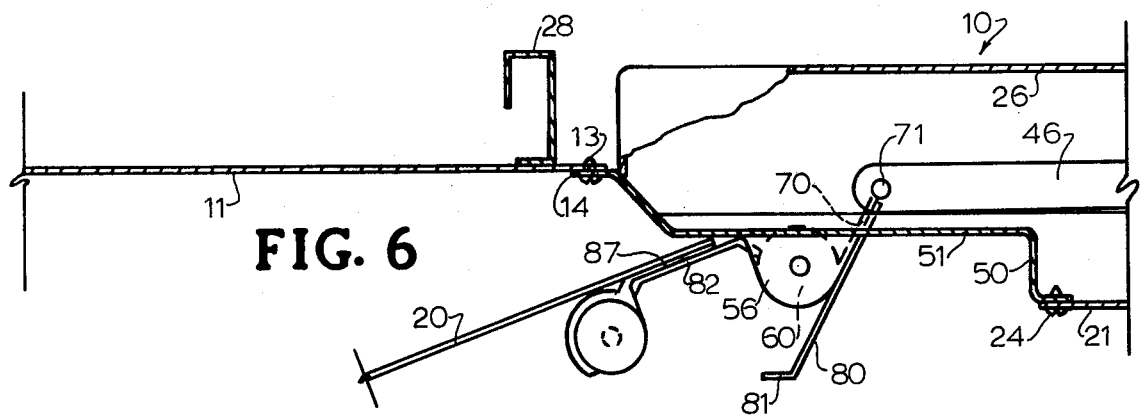
FIG. 6 is a fragmentary plan view illustrating how the sign is bendable back against the bus body as in the case of a student slapping or pulling the sign as he passed by and forcing the sign back against the bus body.
Figure 7:
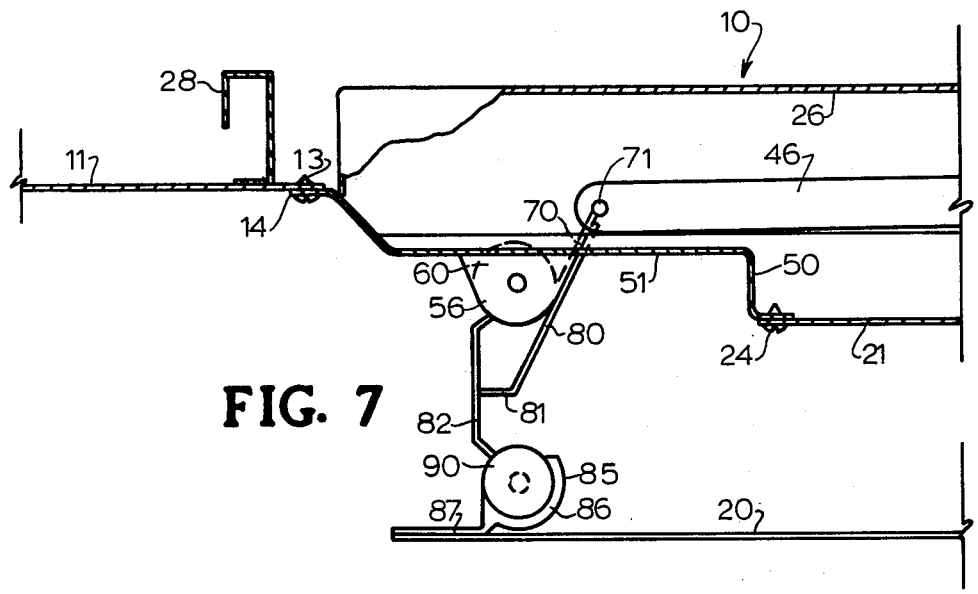
FIG. 7 is a fragmentary plan view illustrating how the sign is bendable back against the sign housing when in a deployed position should, for example, a child hit or push the sign in that direction.
Figure 8:
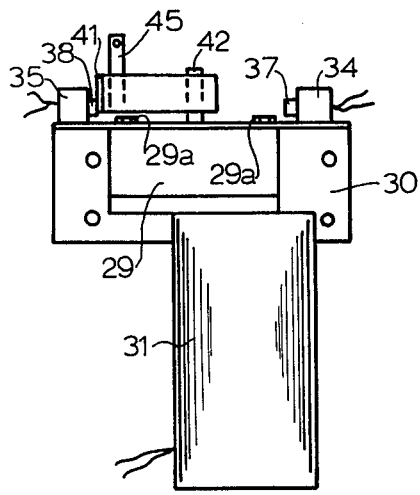
FIG. 8 is a plan view of the electrical operator means employed by the present invention.
Figure 9:
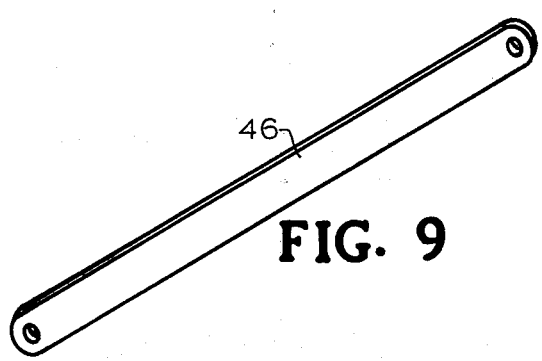
FIG. 9 is a pictorial view of a connecting rod employed by this invention.

Once in a deployed position, sign 20 may be pushed or pulled forwardly towards the bus body by children who might pass by. Such an action will not, however, damage the sign since cylinder 60 is free to pivot in that direction and will return to its proper deployed position by the spring (not shown) within cylinder 60. FIG. 6 illustrates this movement. Also, once deployed, sign 20 may be pushed or pulled rearwardly by children who might pass by. Such an action will, however, not damage unit 20 since cylinder 88 is free to pivot in that direction and will return to its proper deployed position by the spring (not shown) within cylinder 88. FIG. 7 illustrates this movement.

A power source, preferably the bus battery, is connected to a two-position manual switch 100 through wiring which passes through an appropriate opening 101 in housing 19 and connects the power source to motor 31. When the switch 100 is in the off or retracted position, arm 41 rests in contact with spring 38 of limit switch 35 which maintains the lights in a non-flashing condition. When switch 100 is in the on or deployed position, arm 41 rests in contact with spring 37 of limit switch 34 which turns the lights to an on or flashing condition. Sign 20 is normally in the retracted position of FIG. 4. The bus lights 15 and 17 continue to flash as long as manual switch 100 is in the on or deployed position.

After the children have been safely discharged from the bus, to retract sign 20, manual switch 100 is flipped to the off or retract position, which allows motor 31 to move arm 41 back to switch 35. When arm 41 reaches and contacts spring 38 of limit switch 35 the motor 31 stops and sign 20 is held in the retracted position.

It will, of course, be understood that when the apparatus of the invention is installed top and bottom housing portions 25, 26 are vertically oriented. Top wall 25, thus, provides an outer wall and bottom wall 26 provides a base wall. The terms "top" and "bottom" in the description should thus be construed in this sense. It is also to be noted that the arm 41 could be replaced by a cam shaped member or any equivalent switch actuator means and the term "arm" is to be so construed.

What is claimed is:

1. A stop sign apparatus for a school bus, comprising in combination:

(a) a housing having an outer wall, a base wall opposing said outer wall, opposing end walls and opposing sidewalls, said walls being rectangular in shape and integrally joined to provide a substantially rectangular box-like internal housing cavity, said outer wall having a first rectangular opening therein adjacent the normally rearwardly disposed end of said housing, a cover detachably secured thereto and having a second rectangular opening adjacent the normally forwardly disposed end of said outer wall and means enabling said housing to be rigidly secured to an exterior school bus sidewall with said base and outer walls vertically positioned;

(b) a reversible DC gear motor mounted within said housing opposite said first opening and having a base portion rigidly secured to said base wall, an output shaft, an arm mounted at one end on said output shaft and rotatable within said cavity and a stub shaft axially oriented parallel to said output shaft and mounted on and extending outwardly from an opposite end of said arm;

(c) a connecting rod arranged for longitudinal reciprocal movement within said housing and pivotally secured at one driven end to said stub shaft for being driven thereby and having an opposite drive end;

(d) a sign mounting and spring-loaded linkage arrangement including a first linkage member having a pivotal mount on said housing with one end thereof extending into said housing and pivotally connected to said connecting rod drive end and an opposite unattached end thereof extending outwardly through said second opening and pivotal about an axis parallel to said stub shaft axis and located externally of said housing proximate said second opening, a second linkage member having one inner end pivotally mounted on said housing and an opposite outer sign support end extending therefrom, said second linkage member being pivotal about an axis parallel to the axis about which said first linkage member pivots, first spring means arranged to releasably force a rearwardly facing, outwardly disposed surface portion of said second linkage member in contacting drive relation with said unattached end of said first linkage member enabling said second linkage member the freedom in abnormal operating conditions of being forced forward against the tension of said first spring means and away from said first linkage member while in normal operating conditions being adapted to remain in loose driving contact with the said unattached end of said first linkage member, a third linkage member having a pivotal mount on said second linkage member outer sign support end and pivotal thereon about an axis parallel to the axis about which said second linkage member rotates and having a leg portion arranged to engage said second linkage member outer sign support end, second spring means arranged to releasably force said third linkage member leg portion against said second linkage member in a normal operating position while enabling said third linkage member leg portion the freedom under abnormal conditions to pivot away from said second linkage portion;

(e) a sign member with warning lights mounted thereon and having an inner edge portion secured to said third linkage member leg portion and adapted to being normally pivoted by said sign mounting and linkage arrangement between a retracted position in which it extends rearwardly and parallel to said bus sidewall and a deployed position in which it extends outwardly and perpendicular to said bus sidewall and when in said deployed position being swingable with said third linkage member leg portion either rearwardly about the axis about which said third linkage member pivots or forwardly about the axis about which said second linkage member pivots;

(f) first and second normally closed limit switches mounted in opposed positions proximate and in the path of rotation of said arm, said first switch being arranged to be contacted by said arm when said sign is in said deployed position and said second switch being arranged to be contacted by said arm when said sign is in said retracted position;

(g) a manual electric control switch within said bus in a position accessible to the driver of said bus, said switch having a deploy and retract position corresponding to deployment and retraction of said sign member;

(h) first circuit means including connecting wiring enabling said gear motor to be connected to the bus battery through said second limit switch in a first circuit configuration when said control switch is in one position preparatory to sign deployment when the bus is stopped and in which first circuit configuration said arm, connecting rod and linkage arrangement is actuated by said gear motor shaft rotating in one direction to move said sign member to said deployed position whereupon said second limit switch is electrically opened by contact with said arm and said battery is disconnected from said gear motor and enabling said gear motor to be connected to the bus battery through said first limit switch in a second circuit configuration when said control switch is in another position preparatory to sign retraction when the bus is ready to move and in which said second circuit configuration said arm, connecting rod and linkage arrangement is actuated by said gear motor shaft rotating in an opposite direction to move said sign member to said retracted position whereupon said first limit switch is electrically opened by contact with said arm and said battery is disconnected from said gear motor; and (i) second circuit means including a circuit interrupter, said first circuit means wiring being connected such that said sign warning lights are continuously energized by said battery through said circuit interrupter and independent of the electrical position of said first and second limit switches and electrically flash when and so long as said control switch is in said one position.

2. In a stop sign apparatus as claimed in claim 1 adapted for recessed mounting wherein said means integral with said housing for securing said apparatus to the exterior school bus sidewall comprises an outwardly extending flange structure located intermediate the depth of said housing and having holes therein for mounting receiving screws therethrough enabling said housing to be secured to and recessed in a school bus body in a corresponding hole cut therein.

3. In a stop sign apparatus as claimed in claim 1 including a mounting bracket secured to said base wall and wherein said gear motor base portion and said limit switches are releasably secured to said bracket thereby providing a subassembly of said gear motor, bracket and limit switches removable through said first opening during repair, maintenance and the like.

4. A stop sign apparatus for a school bus, comprising in combination:

(a) a housing having opposing outer and base walls, opposing end walls and opposing sidewalls, said walls being integrally joined to provide a box-like internal housing cavity and means enabling said housing to be releasably secured to an exterior school bus sidewall with said base and outer walls vertically positioned;

(b) a reversible DC motor mounted within said housing and having a base portion secured therein;

(c) a sign mounting and spring-loaded linkage arrangement including switch actuator means positioned by said motor, a first linkage member having a pivotal mount on said housing with one end thereof extending into said housing and connected to be actuated by said motor and an opposite unattached end thereof extending outwardly through said housing, a second linkage member having one inner end pivotally mounted on said housing and an opposite outer end extending therefrom, said second linkage member being pivotal about an axis parallel to the axis about which said first linkage member pivots, first spring means arranged to releasably force said second linkage member in contacting drive relation with said unattached end of said first linkage member enabling said second linkage member the freedom in abnormal operating conditions of being forced forward against the tension of said first means and away from said first linkage member while in normal operating conditions being adapted to remain in loose driving contact with the said unattached end of said first linkage member, a third linkage member having a pivotal mount on said second linkage member outer end and pivotal thereon about an axis parallel to the axis about which said second linkage member rotates, second spring means arranged to releasably force said third linkage member against said second linkage member in a normal operating position while enabling said third linkage member the freedom under abnormal conditions to pivot away from said second linkage member;

(d) a sign member with warning lights mounted thereon and having an inner edge portion secured to said third linkage member and adapted to being normally pivoted by said sign mounting and linkage arrangement between a retracted position in which it extends rearwardly and parallel to said bus sidewall and a deployed position in which it extends outwardly and perpendicular to said bus sidewall and when in said deployed position being swingable with said third linkage member either rearwardly about the axis about which said third linkage member pivots or forwardly about the axis about which said second linkage member pivots;

(e) first and second normally closed limit switches mounted in opposed positions proximate said motor and switch actuation means, said first switch being arranged to be contacted by said switch actuator means when said sign is in said deployed position and said second switch being arranged to be contacted by said switch actuator means and when said sign is in said retracted position;

(f) a manual electric control switch within said bus in a position accessible to the driver of said bus, said switch having a deploy and retract position corresponding to deployment and retraction of said sign member;

(g) first circuit means including connecting wiring enabling said motor to be connected to the bus battery through said second limit switch in a first circuit configuration when said control switch is in one position preparatory to sign deployment when the bus is stopped and in which first circuit configuration said linkage arrangement is actuated by said motor shaft rotating in one direction to move said sign member to said deployed position whereupon said second limit switch is electrically opened by contact with said actuator means and said battery is disconnected from said gear motor and enabling said gear motor to be connected to the bus battery through said first limit switch in a second circuit configuration when said control switch is in another position preparatory to sign retraction when the bus is ready to move and in which said second circuit configuration said linkage arrangement is actuated by said motor rotating in an opposite direction to move said sign member to said retracted position whereupon said first limit switch is electrically opened by contact with said actuator means and said battery is disconnected from said motor; and (h) second circuit means including a circuit interrupter, said first circuit means wiring being connected such that said sign warning lights are continuously energized by said battery through said circuit interrupter and independent of the electrical position of said first and second limit switches and electrically flash when and so long as said control switch is in said one position.

* * * * *

UNITED STATES PATENT OFFICE
CERTIFICATE OF CORRECTION

Patent No. 4,138,668　　　　　　　　　Dated February 6, 1979

Inventor(x)　Joseph E. Latta

It is certified that error appears in the above-identified patent and that said Letters Patent are hereby corrected as shown below:

Col. 1, line 50, "communication" should be --commercialization--.

Col. 7, line 59, --spring-- should be inserted before "means".

Signed and Sealed this

Fifth Day of June 1979

[SEAL]

Attest:

RUTH C. MASON
Attesting Officer

DONALD W. BANNER
Commissioner of Patents and Trademarks